June 30, 1931.  J. J. JENSEN  1,812,242

MACHINE FOR THE MANUFACTURE OF HOLLOW ARTICLES

Filed Oct. 26, 1929   4 Sheets-Sheet 1

Inventor:
J. J. Jensen
By: Marks & Clerk
Attys.

June 30, 1931.  J. J. JENSEN  1,812,242
MACHINE FOR THE MANUFACTURE OF HOLLOW ARTICLES
Filed Oct. 26, 1929  4 Sheets-Sheet 2
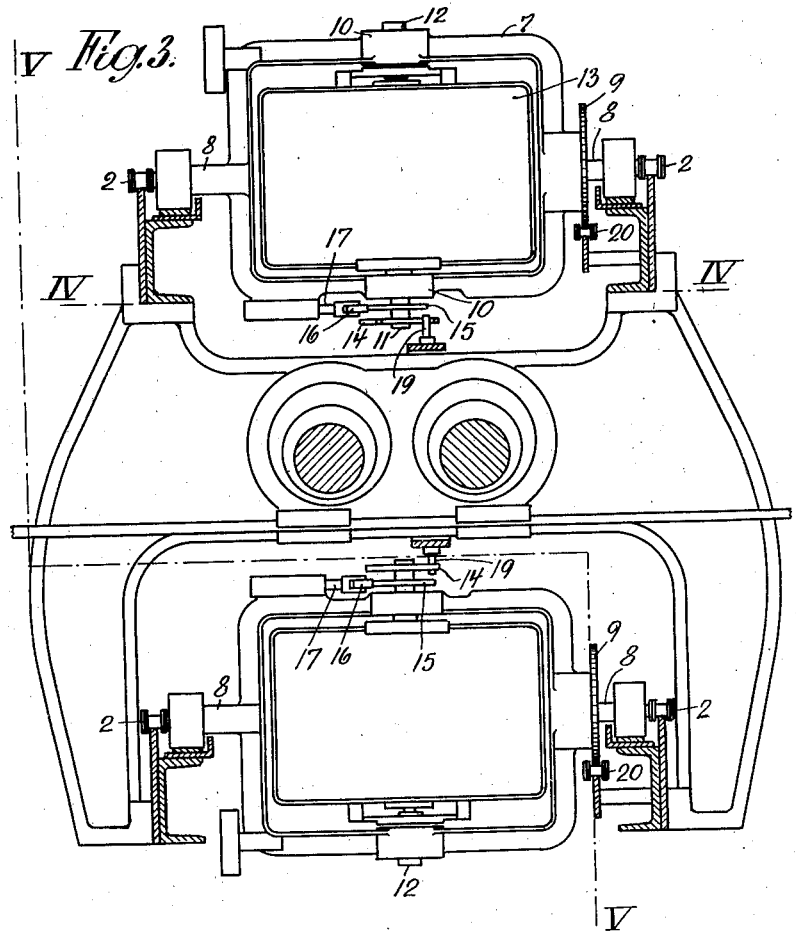
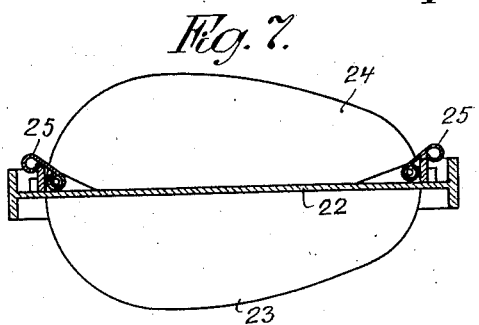
Inventor:
J. J. Jensen June 30, 1931.  J. J. JENSEN  1,812,242
MACHINE FOR THE MANUFACTURE OF HOLLOW ARTICLES
Filed Oct. 26, 1929    4 Sheets-Sheet 3

Inventor:
J. J. Jensen
By: Marks & Clerk
   Attys.

June 30, 1931.  J. J. JENSEN  1,812,242

MACHINE FOR THE MANUFACTURE OF HOLLOW ARTICLES

Filed Oct. 26, 1929   4 Sheets-Sheet 4

Inventor:
J. J. Jensen

By Marks+Clerk
Attys.

Patented June 30, 1931

1,812,242

UNITED STATES PATENT OFFICE

JENS JOHANNES JENSEN, OF COPENHAGEN, DENMARK, ASSIGNOR TO MESSRS. BOGGILD & JACOBSEN, OF COPENHAGEN, DENMARK

MACHINE FOR THE MANUFACTURE OF HOLLOW ARTICLES

Application filed October 26, 1929, Serial No. 402,654, and in Germany November 5, 1928.

The present invention relates to a machine for the manufacture, that is casting, of hollow articles.

The machine to be described in the following is mainly intended to be used in manufacturing articles made of chocolate, such as Easter eggs and the like, but the machine may also, without any modification, be used for casting other small articles which are to be manufactured in great numbers and all alike.

The object of the present invention is to cause the moulds, after the liquid mass has been filled into the same, to be exposed to a rotary motion in two planes, the result being that the liquid mass during the casting process will be uniformly distributed over the entire inside of the mould so that the walls will be of exactly uniform thickness throughout.

The main distinguishing feature of the present invention is that an endless intermittently or uniformly moving mould belt contains moulds which after having received the liquid mass are submitted automatically during the passage of the moulds to rotations in two planes the said rotations being arranged in such a manner that the motion in one plane is continuous, and in the other plane intermittent or, maybe intermittent in both planes, whereafter the moulds when the liquid mass is solidified subsequently pass through a cooling chest and finally over a vibrating table.

It should be mentioned that it may also be of advantage to expose the moulds to vibrations during the solidification period.

The invention is illustrated on the drawings, where:

Fig. 1 shows in outline a longitudinal section of the entire device according to the invention, Fig. 2 is a vertical longitudinal section of a detail of the mould belt and the members moving the moulds, Fig. 3 shows on an enlarged scale a cross-section along the line III—III in Fig. 2 and Fig. 4 is a longitudinal section taken along the line IV—IV in Fig. 3 and viewed from above Fig. 5 is a side elevation of the parts shown in Fig. 3 with part in section along the line V—V in Fig. 3

Fig. 7 is a section taken along the line VII—VII in Fig. 6,

Figure 1:
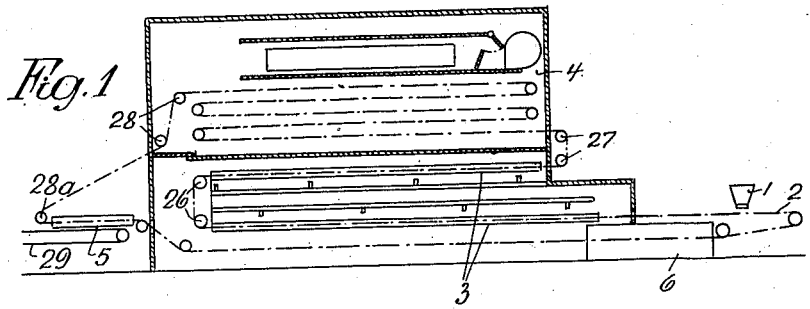

In the drawings 1 is a pouring funnel below which a mould belt 2 is passing. This mould belt is endless and passes first a shaking device 3, then a cooling chest 4, then a second shaking device 5 in order finally to return through a heating chest 6, to the pouring funnel 1. The mould belt 2 consists of a couple of parallel endless chains 2 between the links of which, frames 7 are suspended in pivot pins 8. One of the two pins 8 also carries a sprocket wheel 9. Each of the long sides of the frame 7 is fitted with a bearing 10 for pivot pins 11, 12 about which the moulds 13 may rotate. The connection between these pins and the mould proper may of course be effected in various manners. The main requirement is that the mould plate 13 should be extremely easy to exchange.

One of the pivot pins, marked 11 on the drawings, supports a star wheel 14 and in connection with the latter a square disc 15 co-operating with a spring actuated rod 17 fitted with a roller 16. On the vibrating frame 18 vertical pins 19 are disposed at suitable distances from one another and are adapted to co-operate with the above described star wheels 14.

The above mentioned sprocket wheel 9 on one of the pins 8 co-operates with two endless chains 20 which by means of a special device are driven at an adjustable speed which may differ from the speed of the mould belt proper. Thereby the speed of the continuous rotation may easily be adjusted as desired; the rotary speed depending on the difference between the speed of the mould belt 2 and the speed of the chains 20.

It will now be easy to see that by this arrangement the frames 7 carrying the moulds 13 will be rotated about the pivot pins 8, at the same time as they are moved along the top of the vibrating frame 18 which may, in a known manner be given a vibratory motion, for instance from a couple of eccentrically disposed shafts 21 or swinging weights. The moulds 13 include plates 22 with recesses 23 corresponding to the halves of the articles to be cast.

In the case of large articles, only one of the two halves may be placed on each mould plate. In the case of small articles, on the other hand, the number of moulds for each mould plate will of course be increased correspondingly. To each bottom mould corresponds a loose top mould 24 which may be connected to the bottom mould in a suitable manner which does not form part of the present invention. There may either be an upper mould plate 24 corresponding exactly to the lower mould or recess 23, or what in most cases will be preferable, a loose top mould corresponding to each of the recesses 23 in the mould plate 22. These loose top moulds 24 may then be attached by means of straps, clips 25 or the like in such a manner that they are easy to attach and easy to detach.

Figure 2:
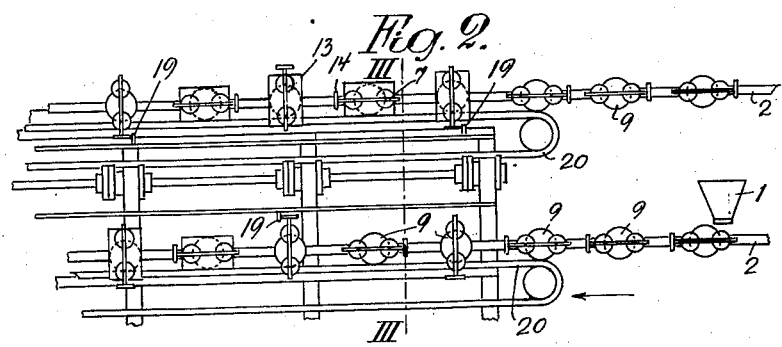
Figure 4:
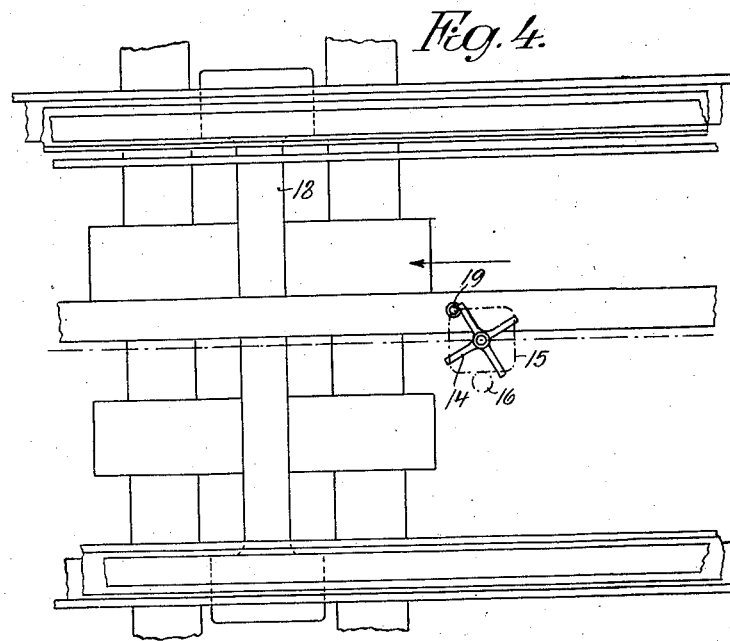
Figure 5:
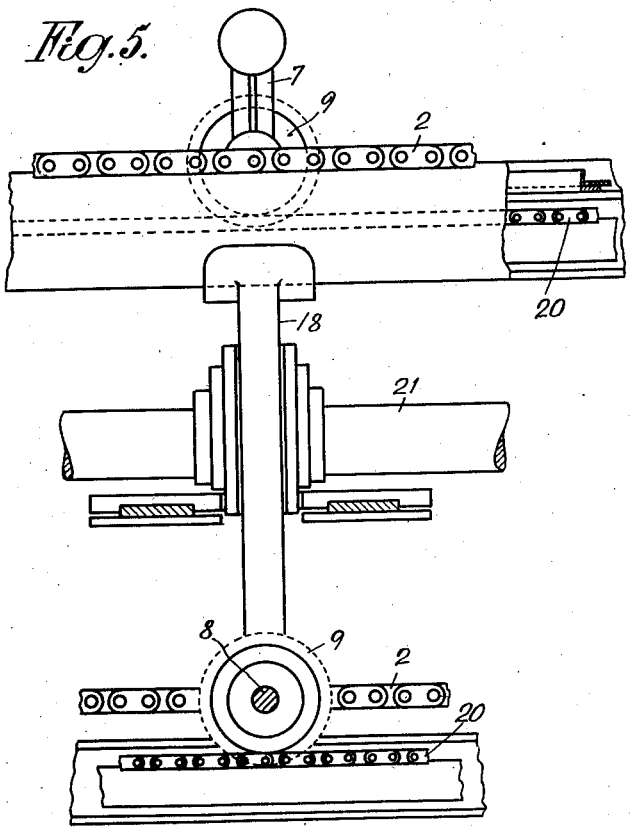
Figure 6:
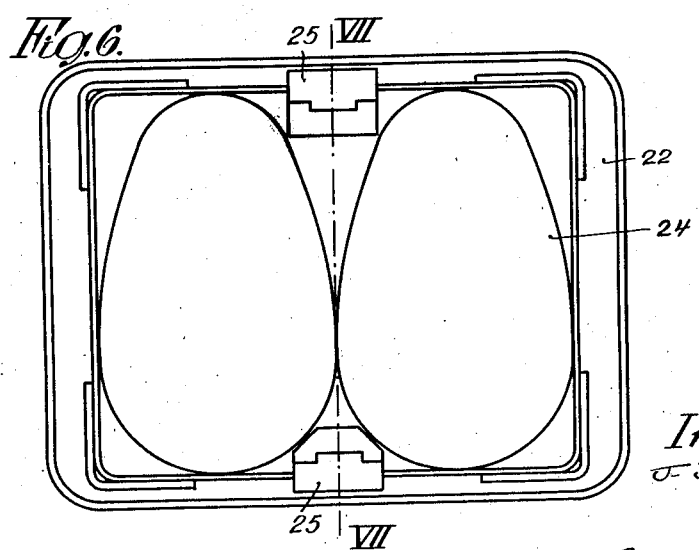
Fig. 6 shows a mould plate viewed from above.

The machine works in the following manner:

The mould belt 2 is assumed to travel in the direction indicated by the arrows in Figs. 1, 2 and 4 and are supplied with liquid mass from the pouring funnel 1 which by means of suitable devices, not forming a part of the present invention, deliver a predetermined quantity of liquid mass into each bottom mould in each mould plate. When the mould belt then passes further on and comes clear of the funnel 1, loose top moulds 24 are placed over the recesses or bottom moulds 23 in the mould plate 22, and by continued motion of the mould belt they will arrive at the vibrating frame 18 where the mould belt proper will be exposed to an intense vibration. At the same time the sprocket wheels 9 on the pivot pins 8 will come into engagement with the above mentioned endless chains 20 which as mentioned above are moving at different speed from the mould belt 2. The frames 7 will consequently be rotated about an axis of rotation passing through the pivot pins 8, but whenever the star wheel 14 passes a pin 19 the mould 13 will also be turned 90° about an axis of rotation passing through the pivot pins 11 and 12. Care should be taken that the motion of the chains 20 should be regulated in such a manner that the star wheel 14 will be in its topmost position when it passes one of the pins 19.

After the mould belt has passed along the bottom side of the vibrating table it returns over a pair of guide rollers 26 and now passes backward along the top side of the vibrating table which is similarly fitted with pins 19. After having travelled back the mould belt is directed by other guide rollers 27 into a cooling chest 4 and from there by other guide rollers 28 and 28a to another vibrating table 5. During the passage between the rollers 28 and 28a the top moulds 24 are removed or loosened, and when the moulds now pass along the top of the vibrating table 5, the cast articles will be shaken out from the moulds and drop down on to a conveyor 29.

It has to be mentioned that the machine may of course be modified in various manners all depending on the object in view.

Figure 8:
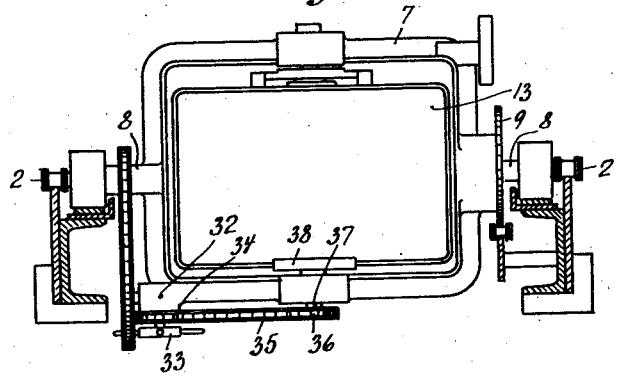
Fig. 8 shows the same picture as the upper part of Fig. 3, but with another device for intermittently turning of the moulds.
Figure 9:
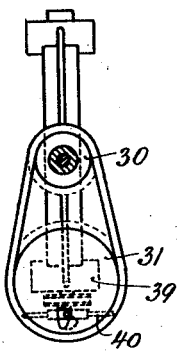
Fig. 9 is a side view of this device.

Figs. 8 and 9 show a modified construction of the transmission of the intermittent motion to the mould-holding frames 7 of the mould belt 2.

One of the pivot pins 8 of the frame 7 is fitted with a sprocket wheel 30 which by means of a chain is connected to another sprocket wheel 31 journaled about a pin on a lug 32 on the mould frame 7. At right angles to the plane of rotation of the sprocket wheel 31 there is provided a rotary star wheel 33 which is connected to another sprocket wheel driving by means of a chain 35, a sprocket wheel 36 on a pivot pin 37, which passes through the frame 7 and carries on the inside a member 38 taking the mould plate itself along. The sprocket wheel 31 is fitted with a hole 39 co-operating with the pin-shaped ray 40 on the star wheel 33. On the inside of the sprocket wheel 31 there may be provided, immediately in front of the hole 39, a cam serving to force the pin 40 to engage the hole 39 successively and, thereby, to turn the star wheel one quarter of a revolution, which rotation is again transmitted to the moulds and the member 38 and causes the mould plate to be rotated one quarter of a revolution, whenever the wheel 31 makes one full revolution.

For example, although in the construction hereinbefore described the mould plate 13 is given a continuous rotation in one direction and an intermittent rotation in another direction, these different rotations may of course be interchanged or both rotations may be intermittent, if desired.

Having now described my invention what I claim as new and desire to secure by Letters Patent is:

1. A machine for casting hollow articles of chocolate comprising endless belts, frames connected with the belts, molds connected with the frames by pins, certain pins having star wheels fixed thereto, pins fixed to the machine adapted to engage the star wheels to effect intermittent rotation of the molds, square disks fixed to the mold pins, a spring pressed rod carried by the mold assembly and having a roller thereon engageable with the periphery of the disk and serving to maintain the star wheels in positions to positively position the arms thereof for engagement with the pins fixed to the machine.

2. A machine for casting hollow articles of chocolate comprising endless belts, frames having pins upon their ends pivotally engaging the belts, sprocket wheels carried by the frames, molds confined within the frames and having pins carried thereby adapted to rotatably engage the sides of the frames, an endless chain engaged with the sprocket wheels adapted to continuously rotate the frames in one plane, and means carried by the pins of the mold for intermittently rotating the molds in another plane during travel of the belts and chains.

3. A machine for casting hollow articles of chocolate, comprising endless belts, frames, molds pivotally supported within the frames, said frames having pins carried thereby for direct engagement with the belts, means traveling at a speed differing from the speed of the belts to impart rotary movement to the frames in one plane, and means for imparting intermittent rotary movement to the molds in another plane during travel of said means and belts.

In testimony whereof I affix my signature.

JENS JOHANNES JENSEN.